United States Patent
Abuan et al.

(10) Patent No.: US 8,356,103 B2
(45) Date of Patent: Jan. 15, 2013

(54) NAT TRAVERSAL FOR MEDIA CONFERENCING

(75) Inventors: Joe Abuan, Milpitas, CA (US); Berkat Tung, Sacramento, CA (US); Hyeonkuk Jeong, San Jose, CA (US); Joshua Graessley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/277,884

(22) Filed: Oct. 20, 2011

(65) Prior Publication Data

US 2012/0042027 A1    Feb. 16, 2012

Related U.S. Application Data

(62) Division of application No. 10/769,841, filed on Feb. 2, 2004, now Pat. No. 8,065,418.

(51) Int. Cl.
*G06F 15/16* (2006.01)
(52) U.S. Cl. .................................. 709/228; 709/245
(58) Field of Classification Search .................. 709/223, 709/225, 227–230, 245
See application file for complete search history.

(56) References Cited

U.S. PATENT DOCUMENTS

| | | | | |
|---|---|---|---|---|
| 6,879,593 B1 * | 4/2005 | Kunze et al. | .................. | 370/401 |
| 7,290,060 B2 * | 10/2007 | Kong | ............................ | 709/245 |
| 7,305,546 B1 * | 12/2007 | Miller | ............................ | 713/153 |
| 7,577,144 B2 * | 8/2009 | Chang et al. | .................. | 370/392 |
| 7,979,528 B2 * | 7/2011 | Eisenberg et al. | ............ | 709/224 |
| 8,032,583 B2 * | 10/2011 | Liu et al. | ....................... | 709/201 |

OTHER PUBLICATIONS

B. Ford, "Network Address Translation and Peer-to-Peer Applications (NATP2P)"—Internet Draft, The Internet Society, Apr. 2003, 16 Pages.
C. Huitema, "Teredo: Tunneling IPv6 over UDP Through NATs"—Internet Draft, The Internet Society, Aug. 13, 2002, 53 Pages.
M. Handley, "SIP: Session Initiation Protocol", The Internet Society, Mar. 1999, 153 Pages.
J. Rosenberg, "STUN—Simple Traversal of User Datagram Protocol (UDP) Through Network Address Translators (NATs)", The Internet Society, Mar. 2003, 47 Pages.

* cited by examiner

*Primary Examiner* — Patrice Winder
(74) *Attorney, Agent, or Firm* — Blakely, Sokoloff, Taylor & Zafman LLP

(57) ABSTRACT

Methods for establishing a direct peer-to-peer ("P2P") connection between two computers are disclosed. In particular, the methods are designed to work in cases where one or both of the computers are connected to a private network, such private networks being interconnected via a public network, such as the Internet. The connections between the private network and the public network are facilitated by network address translation ("NAT").

15 Claims, 4 Drawing Sheets

| PEER-0 | PEER-1 | PROCESS |
| --- | --- | --- |
| PUBLIC | PUBLIC | NOT NEEDED, BOTH SYSTEMS ADVERTISE PUBLIC ADDRESSES |
| PUBLIC | PRIVATE | ALPHA PROCESS (SEE FIG. 4) |
| PRIVATE | PRIVATE | IF ONE PEER IS FULL CONE, ALPHA PROCESS WORKS, ELSE BETA PROCESS (SEE FIG. 5) |
| PRIVATE | PRIVATE | BETA PROCESS WORKS EVEN WHEN ONE OR BOTH PEER SYSTEMS ARE BEHIND MULTIPLE NATS (SEE FIG. 5) |

FIG. 3

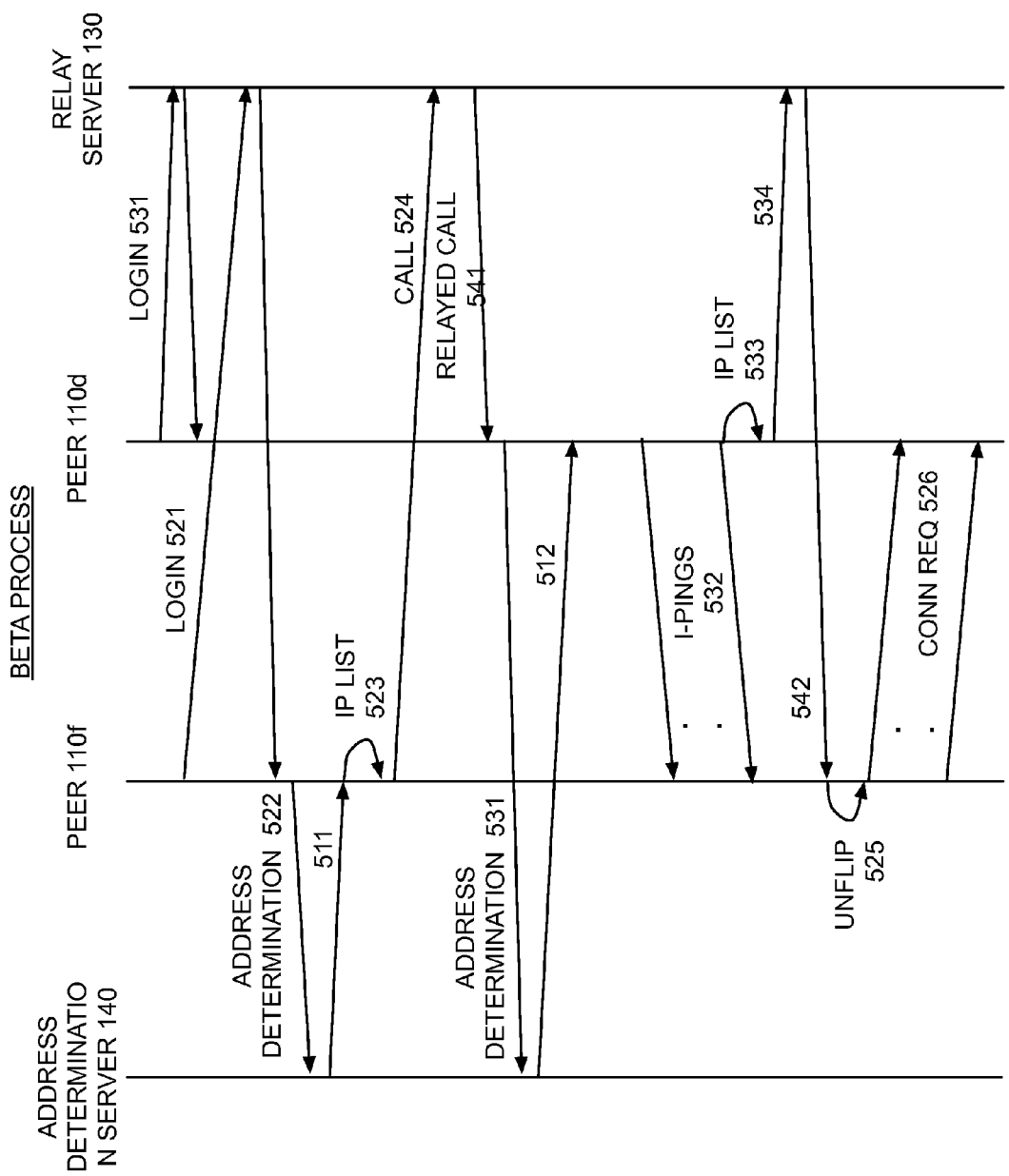

NAT TRAVERSAL FOR MEDIA CONFERENCING

This is a divisional application of, and claims priority to, U.S. patent application Ser. No. 10/769,841 filed on Feb. 2, 2004 now issued as U.S. Pat. No. 8,065,418 B1 and which is hereby incorporated by reference.

BACKGROUND

The invention relates generally to computer systems and more particularly, but not by way of limitation, to a technique for establishing a peer-to-peer ("P2P") connection between two computers in the presence of network address translation ("NAT"). Establishing a P2P connection between two computers is useful for the implementation of various applications, including, for example, gaming, file sharing, and media (audio, video, etc.) conferencing. Although the system herein is described with reference to Internet Protocol ("IP") networks, the invention is not so limited and could be used with other network types.

Large public networks, such as the Internet, frequently have connections to smaller private networks, such as those maintained by a corporation, Internet service provider, or even individual households. By their very nature, public networks must have a commonly agreed upon allocation of network addresses, i.e., public addresses. For a variety of reasons, some of which are discussed in more detail below, maintainers of private networks often choose to use private network addresses for the private networks that are not part of the commonly agreed upon allocation. Thus, for network traffic from the private network to be able to traverse the public network, some form of NAT is required.

As is known to those skilled in the art, the basic principle of NAT is that a private network, having a private addressing scheme, may be connected to a public network, having a standardized addressing scheme, e.g., the Internet through a network address translator. A network address translator (details of which are known to those skilled in the art) alters the data packets being sent out of the private network to comply with the addressing scheme of the public network. Particularly, the network address translator replaces the originating private address and port number of a packet with its own public address and an assigned port number. A network address translator also alters the data packets being received for computers on the private network to replace the destination public address and port number with the correct private address and port number of the intended recipient. As used herein, the term address should be construed to include both an address and a port number if appropriate in the context, as would be understood by one of ordinary skill in the art.

NAT has become increasingly common in modern network computing. One advantage of NAT is that it slows the depletion of public network address space. For example, TCP/IP addressing, which is used on the Internet, comprises four strings of three digits each, thus providing a finite address space. Additionally, certain portions of this address space are reserved for particular uses or users, further depleting the actual number of addresses available. However, if NAT is used, a private network or subnet may use an arbitrary number of addresses, and still present only a single, standardized public address to the outside world. This makes the number of available addresses practically limitless, because each private network could, theoretically, use exactly the same private addresses.

Another advantage provided by NAT is increased security. The increased security arises in part from the fact that those on the public network cannot determine the actual (i.e., private) network address of a computer on a private network. This is because only the public address is provided on the public network by the network address translator. Additionally, this public address may correspond to any number of computers on the private network. This feature also facilitates network address translators acting as firewalls, because data received by the network address translator that does not correspond to a request from a computer on the private network may be discarded.

While this security works well in conventional client-server computing, where connections to a "server" on the public network are initiated by a "client" on the private network, it poses problems for P2P connections. In many P2P applications, it is desirable to establish a connection directly between two computers (i.e., peers) that would be considered clients in a traditional sense, but that may act both as clients and as servers in the context of the P2P connection. Establishing a direct connection becomes increasingly difficult if one or both of the peers is located behind one or more levels of NAT.

Historically, there have been various techniques for establishing a P2P connection in the presence of NAT. These techniques include Relaying, Connection Reversal, UDP Hole Punching, UDP Port Number Prediction, and Simultaneous TCP Connection Initiation. Each of these techniques suffers from various deficiencies that render them undesirable for various applications. For example, Relaying increases network overhead and latency, which is undesirable for timing critical applications such as video conferencing or gaming. Connection Reversal will only work if only one of the peers is located behind a network address translator. UDP Hole Punching, as the name implies, works well only with UDP connections and is less successful using other transport layer protocols, such as TCP. UDP Port Number Prediction requires predictable behavior by the various components, and is also geared toward UDP connections. Simultaneous TCP Connection Initiation requires a degree of luck, both with regard to addressing and port assignment and connection timing, resulting in a fragility that renders it unsuitable for general application.

Thus, it would be beneficial to provide a means to permit computers each located behind one or more NAT layers to establish a direct, P2P connection in a way that is efficient, reliable, and requires minimal redesign of existing network infrastructure.

SUMMARY

The present invention relates to establishing a direct P2P connection between computers wherein one or both of the computers are located behind one or more layers of NAT. In one embodiment, an initiating computer sends a message to the receiving computer by way of a Relay server. The Relay server retransmits this request to the receiving computer, which has already established a connection with the Relay server. Upon receiving this request, the receiving computer determines a list of addresses on which it believes it can be contacted and transmits this information to the Relay server, which then re-transmits the information to the initiating computer. Upon receiving this information, the receiving computer sends direct initiation messages to the addresses provided by the receiving computer until a direct P2P connection is established. If a connection cannot be established, the initiating computer sends a message so indicating to the Relay server, which re-transmits this information to the receiving computer. The receiving computer then starts the process over, this time acting as the initiating computer.

In another embodiment, both the initiating computer and the receiving computer have logged into a Relay server. An initiating computer determines its public address by querying an address-determination server. It then generates a list of addresses on which it believes it can be contacted and transmits this information to the Relay server, which re-transmits this information to the receiving computer. On receiving the initiating computer's address information, the receiving computer also determines its public address and generates a list of addresses on which it believes it can be contacted. The receiving computer also sends a sequence of messages to the initiating computer, which are discarded by a network address translator behind which the initiating computer is located, but which set up the receiving computer's network address translator to later accept a connection. The receiving computer then transmits the addresses on which it believes it can be contacted to the Relay server, which re-transmits this information to the initiating computer. The initiating computer, having received this information, sends a sequence of initiation messages directly to the addresses provided by the receiving computer, and these messages are able to pass through the receiving computer's network address translator because of the earlier sequence of messages sent by the receiving computer.

BRIEF DESCRIPTION OF THE DRAWINGS

FIG. 3 illustrates an operational matrix for selecting which technique in accordance with the present invention is necessary to establish a connection between two peers.

FIG. 5 illustrates the sequence of messages in another technique of establishing a peer-to-peer connection in accordance with the present invention.

DETAILED DESCRIPTION

Techniques (methods and devices) to establish a peer-to-peer ("P2P") connection between computers each located behind one or more levels of network address translation ("NAT") are described herein. The following embodiments of the invention, described in terms applications compatible with computer systems manufactured by Apple Computer, Inc. of Cupertino, Calif., are illustrative only and should not be considered limiting in any respect.

Figure 1:
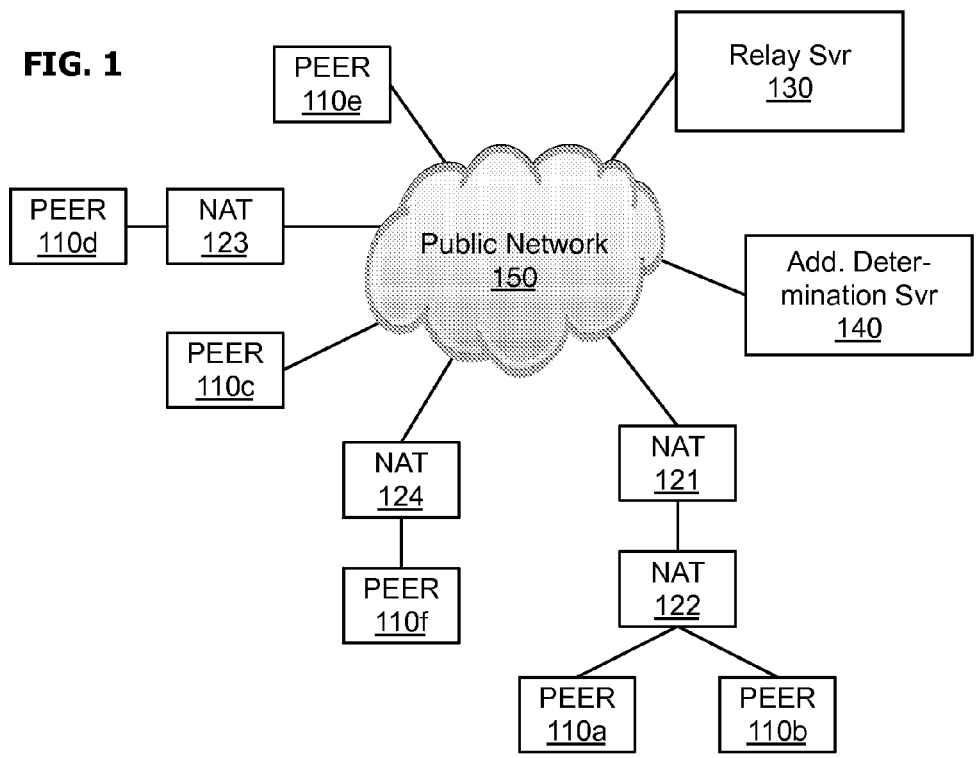
FIG. 1 shows a network topology in which the teachings of the present invention may be used.

Turning now to FIG. 1, a general network topology in which the present invention may be used is illustrated. A plurality of "client" or "peer" computers 110*a* through 110*f* are interconnected by public network 150, which could be, for example, the Internet. Peer computers 110*c* and 110*e* are directly connected to public network 150. Peer computers 110*d* and 110*f* are connected behind network address translators 123 and 124. Still other peer computers 110*a* and 110*b* are connected behind two layers or levels of network address translators, 121 and 122. Relay server 130, which is used in the relaying technique of the prior art is also connected to public network 150. Finally, Address Determination server 140, used to provide a peer's public address in accordance with the teachings of the present invention, is also connected to public network 150. Address Determination server 140 provides the means for a peer to determine its public address and port number as assigned by a network address translator behind which the peer resides.

Figure 2:
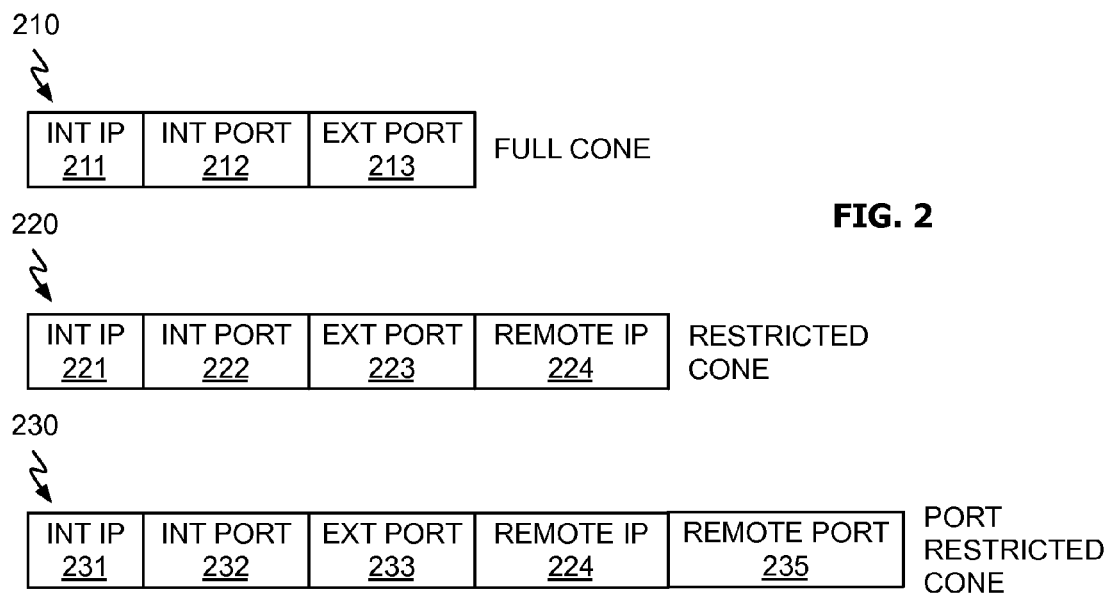
FIG. 2 illustrates the address header information in connection with various types of network address translation.

With reference now to FIG. 2, the address headers used in connection with three common types of NAT are illustrated. A first type of NAT is a full cone NAT, which means that all requests from the same internal (private) IP address and port are mapped to the same external (public) IP address and port. In this type of NAT, any external host can send a packet to the internal host by sending the packet to the mapped external address and host. Address header information 210 for a full cone NAT thus includes internal IP address 211, internal port assignment 212, and external port assignment 213. (The external address will be the public address of the network address translator.)

A second type of NAT is a restricted cone NAT, which means that all requests from the same internal IP address and port are mapped to the same external IP address and port. However, unlike a full cone NAT, an external host can send a packet to the internal host only if the internal host had previously sent a packet to the IP address of the external host. Thus data header 220 includes the same information as with a full cone NAT (internal IP address 221, internal port assignment 222, and external port assignment 223) and also includes additional field 224 that identifies the remote address to which a packet has previously been sent.

A third type of NAT is a port-restricted cone NAT, which is a restricted cone NAT further restricted to port numbers. Specifically, an external host can send a packet to an internal host only if the internal host had previously sent a packet to the specific IP address and port from which the "return" packet originated. Thus, to successfully traverse a port restricted cone NAT, address header 230 must include all the information in a restricted cone header (i.e., internal IP address 231, internal port assignment 232, external port assignment 233, remote IP address 234) and the additional information of the remote port to which a packet has previously been sent.

Additionally, a network address translator may also use port address translation ("PAT"). When PAT is used, the network address translator will use a different port for each outbound address/port combination. If PAT is not implemented, a single port number is used for each client.

FIG. 3 illustrates an operational matrix for determining which process in accordance with the present invention may be used for establish a P2P connection between two peers. For purposes of the following discussion, it is assumed that PEER-0 is initiating the connection with PEER-1. As can be seen from FIG. 3, if both PEER-0 and PEER-1 are located on the public network, as with peers 110*c* and 110*e* of FIG. 1, then no special technique is needed as each computer's packets indicate its true address and port number. If PEER-0, located on the public network, attempts to initiate a connection with PEER-1 located on a private network, as with peer 110*c* attempting to initiate a connection with peer 110*d*, then a first technique ALPHA, discussed below in connection with FIG. 4 may be used. In the situation where both PEER-0 and PEER-1 are both located on private networks, as with peer 110*a* attempting to initiate a connection with peer 110*d*, the technique ALPHA will work if one of the peers is behind a full-cone network address translator (described above with reference to FIG. 2). Otherwise, a second technique BETA, discussed below in connection with FIG. 5 must be used. Technique BETA will work for establishing a connection between two peers each located on a private network, even if both peers are located behind multiple NAT layers, as with peers 110a and 110b of FIG. 1.

Figure 4:
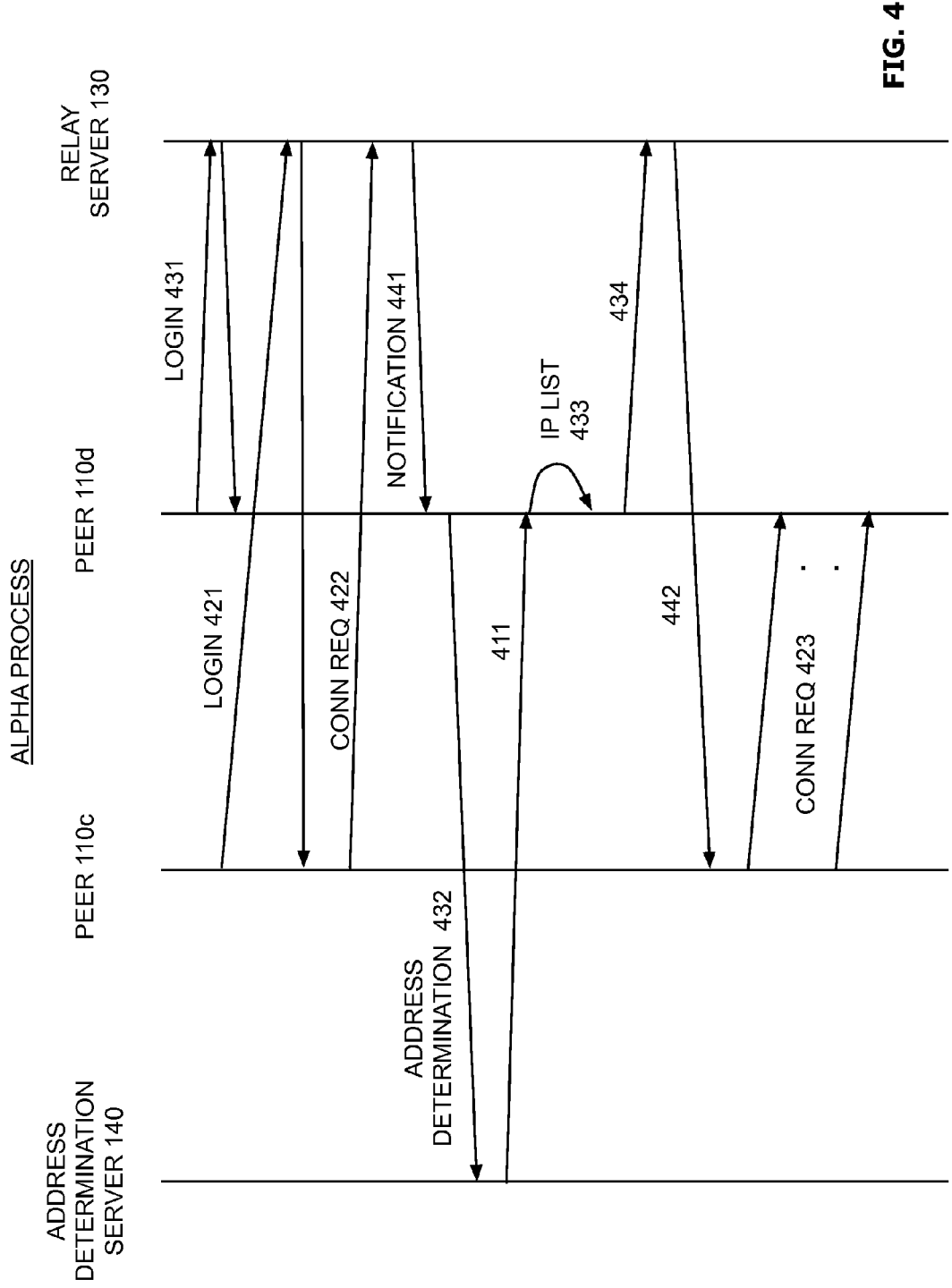
FIG. 4 illustrates the sequence of messages in one technique of establishing a peer-to-peer connection in accordance with the present invention.

Turning now to FIG. 4, first process ALPHA for establishing a connection between initiating peer 110c located on public network 150 and receiving peer 110d located behind network address translator 123 is illustrated. A P2P connection can only be established with peer 110d if this peer has previously logged in to some third party server, for example, Relay server 130. Thus peer 110d transmits login message 431 to Relay server 130. Initiating peer 110c must also login to Relay server 130, by transmitting login message 421. Provided that both peers 110c and 110d have logged into Relay server 130, initiating peer 110c may then request a connection with peer 110d by sending connection request message 422 to Relay server 130, which acts as an intermediary. Relay server 130 then transmits this information to peer 110d as notification message 441.

Upon receiving notification message 441 from Relay server 130 that a connection is requested, peer 110d transmits address-determination message 432 to Address Determination server 140. The purpose of this message is solely for allowing peer 110d to determine its public IP address and port number assignment, which are assigned by network address translator 123. Address Determination server 140 returns reply message 411 to peer 110d, from which peer 110d can determine its public IP address and port assignment.

Peer 110d, having determined its port assignment generates IP-List 433, which is a list of private IP addresses and corresponding ports on which peer 110d can receive a connection. IP-List 433 also includes Flipped List, which is the binary complement of the listing of IP address and port combinations. It will be recognized that a Flipped-List may be generated in accordance with any user-specified transformation of the IP-List's contents (a binary complement is but one transformation). The flipped list is used because some network address translators interrogate outgoing packets and, if they find a local (private) IP address, convert it to the network address translator's external (public) IP address. This action would destroy IP-List 433, which is used by peer 110c for initiating the connection. Once generated, IP-List 433 is transmitted to Relay server 130, which re-transmits the IP-List 442 to peer 110c.

Taking the information from IP-list 442, peer 110c then begins initiating a direct P2P connection with peer 110d. Specifically, peer 110c steps through the addresses and ports contained in IP-list 442 issuing connection requests 423 to peer 110d until it is able to establish a connection with peer 110d (using the "flipped" aspect of IP List 442 if necessary). In one embodiment, session initiation protocol ("SIP") invitation messages comprise connection requests 423. Generally, connection request messages 423 after issued one after another, with a specified time delay between each transmission. For example, three (3) seconds. If peer 110c is unable to establish a connection with peer 110d, peer 110c can ascertain that peer 110d is behind a network address translator and/or firewall and that network address translator and/or firewall is restricted. Peer 110c would then contact Relay server 130 and ask the Relay server to have peer 110d contact peer 110c. At that time, the process of FIG. 4 is repeated, but with peer 110d trying to initiate communication.

Turning now to FIG. 5, process BETA is illustrated which works regardless of which peer initiates communication and regardless of how many network address translators or firewalls either or both peers are behind. For purposes of explanation of FIG. 5, it is assumed that peer 110f is initiating a P2P connection with peer 110d. The beginning of the process requires both peers to have logged onto Relay server 130, which is done by the transmission of logon message 521 by peer 110f and logon message 531 by peer 110d. To initiate a P2P session, peer 110f transmits address detection message 522 to Address Detection server 140.

As with method ALPHA described above, address determination message 522 allows peer 110f to determine its public IP address and port number. Address Determination server 140 returns message 511 to peer 110f, from which peer 110f can determine its public IP address and port assignment. Having determined its IP address and port assignment, peer 110f then generates IP-List 523, which is a list of local IP addresses and corresponding ports. As with method ALPHA described above, IP-List 523 also includes a flipped List, i.e., the binary complement of the listing of IP address and port combinations. Once generated, IP-List 523 is transmitted to peer 110d by way of Relay server 130 as part of call message 524.

Peer 110d, upon receiving peer 110f's IP-list 523 as part of relayed call message 541 from Relay server 130, then sends its own address determination message 531 to Address Determination server 140 so that peer it may determine its public IP address and port number. Address Determination server 140 returns message 512 to peer 110d in which its public IP address and port assignments are identified. Peer 110d then begins sending a series of I-Ping messages 532 to peer 110f. In one embodiment, each I-Ping message 532 is a junk UDP packet, and one is sent to each of peer 110f's IP-List entries. While each I-Ping packet is dropped by peer 110f's network address translator, these packets set up peer 110d's network address translator to later receive and accept an incoming connection request message (e.g., a SIP invitation message).

Having determined its IP address and port assignment, peer 110d then generates its own IP-List 533, which also includes a flipped list. Once generated, IP-List 533 is transmitted to peer 110f by way of Relay server 130 as message 534. Relay server 130 re-transmits this information via message 542 to peer 110f, which determines the IP address/port pairs in unflip operation 525. Peer 110f then sends a connection request message 526 (e.g., a SIP invitation message) to each IP/port pair in peer 110d's IP-List until a connection is received and accepted. Once one of the connection request messages is accepted, a P2P connection is established directly between peer 110f and peer 110d. As described above, individual connection request messages may be staggered in time such as, by three (3) seconds. As previously noted, process BETA described above may be used with all types of connections because neither peer knows or cares if its targeted system is public or private or how many layers of NAT are present.

While the invention has been disclosed with respect to a limited number of embodiments, numerous modifications and variations will be appreciated by those skilled in the art. It is intended that all such variations and modifications fall with in the scope of the following claims.

The invention claimed is:

1. A method for initiating a peer-to-peer network connection between a first computer and a second computer across a public network, wherein at least one of the first and second computers is on a private network and is connected to the public network through a network address translator, the first and second computers having each established a connection to a common Relay server, the method comprising:

receiving at the second computer from the Relay server a connection request message re-transmitted from the first computer;

sending an address-determination message from the second computer to an address-determination server;

receiving at the second computer a reply to the address-determination message;

composing and sending from the second computer to the Relay server for re-transmitting to the first computer a message comprising one or more addresses corresponding to the second computer; and waiting for an attempt by the first computer to initiate a direct connection between the first computer and the second computer.

2. The method of claim 1 further comprising:

receiving at the second computer a message from the Relay server originating at the first computer indicating that the first computer is unable to establish a direct connection with the second computer; and attempting to initiate a connection directly from the second computer to the first computer in response to the message indicating that the first computer is unable to establish a direct connection with the second computer.

3. The method of claim 2 wherein the act of attempting to initiate a connection directly from the second computer to the first computer comprises:

sending a connection request message from the second computer to the Relay server for retransmitting to the first computer;

receiving at the second computer from the Relay server a message originating at the first computer, said message comprising one or more addresses corresponding to the first computer; and attempting to initiate a connection from the second computer directly to one or more of the addresses corresponding to the first computer.

4. The method of claim 3 wherein the one or more addresses corresponding to the first computer comprises one or more IP addresses and one or more port numbers.

5. The method of claim 4 wherein the message comprising one or more addresses corresponding to the first computer further comprises a specified transformation of the one or more addresses.

6. The method of claim 5 wherein the specified transformation comprises a binary complement transformation.

7. The method of claim 1 wherein the Address Determination server is a server other than the common Relay server.

8. A non-transitory program storage device having instructions stored therein for causing a processor to initiate a peer-to-peer network connection between a first computer and a second computer across a public network, wherein at least one of the first and second computers is on a private network and is connected to the public network through a network address translator, the first and second computers having each established a connection to a common Relay server, said instructions comprising:

instructions to receive at the second computer, from the Relay server, a connection request message re-transmitted from the first computer;

instructions to transmit an address-determination message from the second computer, to an address-determination server;

instructions to receive, at the second computer, a reply to the address-determination message;

instructions to compose and send from the second computer to the Relay server for re-transmitting to the first computer, a message comprising one or more addresses corresponding to the second computer; and instructions to wait for an attempt by the first computer to initiate a direct connection between the first computer and the second computer.

9. The non-transitory program storage device of claim 8 further comprising:

instructions to receive at the second computer a message from the Relay server originating at the first computer indicating that the first computer is unable to establish a direct connection with the second computer; and instructions to attempt to initiate a connection directly from the second computer to the first computer in response to the message indicating that the first computer is unable to establish a direct connection with the second computer.

10. The non-transitory program storage device of claim 9 wherein the instructions to attempt to initiate a connection directly from the second computer to the first computer comprises:

instructions to send a connection request message from the second computer to the Relay server for re-transmitting to the first computer;

instructions to receive at the second computer from the Relay server a message originating at the first computer, said message comprising one or more addresses corresponding to the first computer; and instructions to attempt to initiate a connection from the second computer directly to one or more of the addresses corresponding to the first computer.

11. The non-transitory program storage device of claim 10 wherein the one or more addresses corresponding to the first computer comprises one or more IP addresses and one or more port numbers.

12. The non-transitory program storage device of claim 11 wherein the message comprising one or more addresses corresponding to the first computer further comprises a specified transformation of the one or more addresses.

13. The non-transitory program storage device of claim 12 wherein the specified transformation comprises a binary complement transformation.

14. The non-transitory program storage device of claim 8 wherein the Address Determination server is a server other than the common Relay server.

15. A device, comprising:

a network interface adapted to couple to a network;

memory for storing instructions in accordance with claim 8; and a processor for executing the instructions.

* * * * *